United States Patent
An et al.

(10) Patent No.: US 9,952,054 B2
(45) Date of Patent: Apr. 24, 2018

(54) AUTONOMOUS DRIVING CONTROL APPARATUS AND METHOD USING NAVIGATION TECHNOLOGY

(71) Applicant: ELECTRONICS AND TELECOMMUNICATIONS RESEARCH INSTITUTE, Daejeon (KR)

(72) Inventors: Kyoung-Hwan An, Daejeon (KR); Sam-Yeul Noh, Daejeon (KR); Woo-Yong Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 324 days.

(21) Appl. No.: 14/530,883

(22) Filed: Nov. 3, 2014

(65) Prior Publication Data

US 2015/0134180 A1    May 14, 2015

(30) Foreign Application Priority Data

Nov. 8, 2013   (KR) .................. 10-2013-0135460

(51) Int. Cl.
*G01C 21/34* (2006.01)
*G08G 1/005* (2006.01)
(Continued)

(52) U.S. Cl.
CPC ......... *G01C 21/34* (2013.01); *G01C 21/3453* (2013.01); *G05D 1/0289* (2013.01);
(Continued)

(58) Field of Classification Search
None
See application file for complete search history.

(56) References Cited

U.S. PATENT DOCUMENTS 5,016,996 A * 5/1991 Ueno ................... B60Q 1/2665
340/441
5,774,069 A    6/1998 Tanaka et al.
(Continued)

FOREIGN PATENT DOCUMENTS

CH    611561 A5 * 6/1979 .............. B60Q 1/50
CH    611561 A5 * 6/1979 .............. B60Q 1/50
(Continued)

*Primary Examiner* — Shelley Chen
(74) *Attorney, Agent, or Firm* — Rabin & Berdo, P.C.

(57) ABSTRACT

An autonomous driving control apparatus and method using navigation technology are disclosed. The autonomous driving control apparatus includes a driving mode setting unit, a navigation unit, and an information provision unit. The driving mode setting unit sets the driving mode of a vehicle. The navigation unit offers guidance on a driving route to a destination input by the driver of the vehicle based on the set driving mode. The information provision unit, if the driving mode of the vehicle is set to autonomous driving mode, provides the navigator of an adjacent vehicle and the navigator of the terminal of a pedestrian with autonomous driving information received from the vehicle, and also provides the navigation unit with behavior information received from the adjacent vehicle and the terminal of the pedestrian.

20 Claims, 12 Drawing Sheets

(51) Int. Cl.
  *G08G 1/0967* (2006.01)
  *G05D 1/02* (2006.01)
  *B60Q 1/50* (2006.01)

(52) U.S. Cl.
  CPC ......... *G08G 1/005* (2013.01); *G08G 1/09675* (2013.01); *G08G 1/096725* (2013.01); *G08G 1/096791* (2013.01); *B60Q 1/50* (2013.01); *G05D 2201/0213* (2013.01)

(56) References Cited

U.S. PATENT DOCUMENTS

| | | | | |
|---|---|---|---|---|
| 5,901,483 A | * | 5/1999 | Tijanic | B60R 13/00 340/815.62 |
| 8,842,176 B2 | * | 9/2014 | Schofield | B60R 1/00 348/113 |
| 9,120,484 B1 | * | 9/2015 | Ferguson | G05D 1/0055 |
| 9,233,645 B2 | * | 1/2016 | Schofield | B60C 23/00 |
| 9,336,436 B1 | * | 5/2016 | Dowdall | G08G 1/166 |
| 9,381,916 B1 | * | 7/2016 | Zhu | B60W 30/0956 |
| 9,495,874 B1 | * | 11/2016 | Zhu | G06N 3/00 |
| 2002/0195490 A1 | * | 12/2002 | Gehlot | B60R 13/10 235/384 |
| 2007/0188348 A1 | * | 8/2007 | Bauer | G08G 1/162 340/905 |
| 2008/0046150 A1 | * | 2/2008 | Breed | B60R 21/0134 701/45 |
| 2008/0097700 A1 | * | 4/2008 | Grimm | G08G 1/168 701/301 |
| 2009/0134984 A1 | * | 5/2009 | Chen | B60Q 1/268 340/425.5 |
| 2010/0253492 A1 | * | 10/2010 | Seder | G01S 13/723 340/435 |
| 2010/0253594 A1 | * | 10/2010 | Szczerba | G01S 13/723 345/7 |
| 2010/0253596 A1 | * | 10/2010 | Szczerba | G01S 13/723 345/7 |
| 2011/0090093 A1 | * | 4/2011 | Grimm | G01S 5/0072 340/901 |
| 2012/0083960 A1 | * | 4/2012 | Zhu | G05D 1/0214 701/23 |
| 2012/0173069 A1 | * | 7/2012 | Tsimhoni | G01C 21/365 701/25 |
| 2013/0060400 A1 | * | 3/2013 | Hahne | G08G 1/161 701/1 |
| 2013/0090802 A1 | * | 4/2013 | Curtis | G05D 1/024 701/25 |
| 2013/0184980 A1 | * | 7/2013 | Ichikawa | B25J 9/1676 701/301 |
| 2013/0211656 A1 | | 8/2013 | An et al. | |
| 2013/0314503 A1 | * | 11/2013 | Nix | G06K 9/00805 348/46 |
| 2014/0067265 A1 | * | 3/2014 | Maston | G01C 21/3697 701/533 |
| 2014/0114502 A1 | * | 4/2014 | Hugron | B60W 50/14 701/2 |
| 2014/0249717 A1 | * | 9/2014 | Takahashi | B60R 21/00 701/36 |
| 2015/0061850 A1 | * | 3/2015 | Omote | B60Q 5/008 340/425.5 |
| 2015/0134180 A1 | * | 5/2015 | An | G01C 21/34 701/23 |

FOREIGN PATENT DOCUMENTS

| | | | |
|---|---|---|---|
| CN | 103381791 A | * | 11/2013 |
| JP | 05-324058 A | | 12/1993 |
| JP | 08-255020 A | | 10/1996 |
| JP | 09-161196 A | | 6/1997 |
| JP | 2007128235 A | * | 5/2007 |
| JP | 2007128235 A | * | 5/2007 |
| JP | 2009-217350 A | | 9/2009 |
| JP | 2012-203478 A | | 10/2012 |
| KR | 10-1997-0011789 A | | 3/1997 |
| KR | 10-2010-0005362 A | | 1/2010 |
| KR | 10-2010-0088943 A | | 8/2010 |
| KR | 10-2011-0097091 A | | 8/2011 |

* cited by examiner

AUTONOMOUS DRIVING CONTROL APPARATUS AND METHOD USING NAVIGATION TECHNOLOGY

CROSS-REFERENCE TO RELATED APPLICATION

This application claims the benefit of Korean Patent Application No. 10-2013-0135460, filed Nov. 8, 2013, which is hereby incorporated by reference in its entirety into this application.

BACKGROUND OF THE INVENTION

1. Technical Field

The present invention relates generally to an autonomous driving control apparatus and method using navigation technology and, more particularly, to an autonomous driving control apparatus and method that utilize navigation technology as a communication means for providing an adjacent vehicle and a pedestrian with current driving information and future driving information regarding a vehicle that is being driven in autonomous driving mode.

2. Description of the Related Art

The autonomous driving system of an autonomous driving vehicle is a system for recognizing a surrounding environment without the intervention of a driver, determining driving conditions, and autonomously driving the vehicle to a predetermined destination by controlling the vehicle.

Although a driver drives a vehicle while continuously communicating with adjacent vehicles and pedestrians, a conventional autonomous driving system only has the purpose of driving a vehicle to a predetermined destination without accident.

If an autonomous driving system drives a vehicle without communication, a driver within a vehicle, an adjacent vehicle, and a pedestrian may experience an unexpected accident. Furthermore, since a current autonomous driving system is not perfect for all road driving environments (e.g., a working zone and an accident zone), a driver needs to periodically monitor the results of the recognition and behavior of the autonomous driving system. Furthermore, when vehicles are at a standstill on a road, drivers need to escape from such a traffic congestion state through communication. Moreover, when a pedestrian crosses a road, a driver within a vehicle and the pedestrian recognize their behaviors through eye contact. In this case, an autonomous driving system is also required to communicate with a pedestrian because a driver may be drowsy or may not be sitting in the driver's seat.

In relation to this, Korean Patent Application Publication No. 10-2010-0005362 discloses an autonomous driving control system.

SUMMARY OF THE INVENTION

Accordingly, the present invention has been made keeping in mind the above problems occurring in the conventional art, and an object of the present invention is to provide an autonomous driving control apparatus and method that utilize navigation technology as a communication means for providing an adjacent vehicle and a pedestrian with current driving information and future driving information regarding a vehicle that is being driven in autonomous driving mode.

Another object of the present invention is to provide an autonomous driving control apparatus and method that, in autonomous driving mode, transmit autonomous driving information regarding a vehicle to the navigator of an adjacent vehicle via a server and receive information about the behavior of the adjacent vehicle via the navigator of the vehicle.

Yet another object of the present invention is to provide an autonomous driving control apparatus and method that, in autonomous driving mode, transmit autonomous driving information regarding a vehicle to the terminal navigator of a pedestrian via a server and receive information about the behavior of the pedestrian via the navigator of the vehicle.

A further yet object of the present invention is to provide an autonomous driving control apparatus and method that, in autonomous driving mode, output a sentence, prompting a pedestrian to cross a road, to a display means attached to the windshield of a vehicle when the pedestrian waits at an entrance of a crosswalk.

In accordance with an aspect of the present invention, there is provided an autonomous driving control apparatus using navigation technology, including a driving mode setting unit configured to set the driving mode of a vehicle; a navigation unit configured to offer guidance on a driving route to a destination input by the driver of the vehicle based on the set driving mode; and an information provision unit configured to, if the driving mode of the vehicle is set to autonomous driving mode, provide the navigator of an adjacent vehicle and the navigator of a terminal of a pedestrian with autonomous driving information received from the vehicle and also provide the navigation unit with behavior information received from the adjacent vehicle and the terminal of the pedestrian.

The autonomous driving information may include driving environment information, including at least any one of the adjacent vehicle, obstacles, road information and traffic information, driving route information required to reach the destination, and driving information, including information about at least any one of a start, a stop, keeping a lane, a lane change, a direction of the vehicle, a speed of the vehicle, the passing of an intersection, a point where roads come together, a wait for a pedestrian, a wait for a traffic signal, and an emergency wait.

The driving mode setting unit may include a driver driving mode setting unit configured to set the vehicle to driver driving mode in which the vehicle is manually driven by the driver; and an autonomous driving mode setting unit configured to set the vehicle to autonomous driving mode in which the vehicle operates autonomously.

The autonomous driving mode setting unit may include an autonomous driving recognition unit configured to recognize the autonomous driving information required to reach the destination input to the navigation unit by the driver of the vehicle; an autonomous driving control unit configured to control driving devices of the vehicle based on the autonomous driving information; and a provision unit configured to provide the autonomous driving information to the navigation unit.

The autonomous driving control unit may include a lamp control unit configured to control flickering of a direction indication lamp or a brake lamp of the vehicle based on the autonomous driving information; and a display control unit configured to display the autonomous driving information on display means attached to a windshield of the vehicle.

The display control unit may control an output of a sentence, prompting a pedestrian to cross a road, to the display means attached to the windshield of the vehicle if the autonomous driving information corresponds to a wait for a pedestrian.

The navigation unit may include a destination input unit configured to receive the destination from the driver of the vehicle; a first route guidance unit configured to search for the driving route to the input destination based on previously stored driver driving information if the vehicle is set to driver driving mode, and to offer guidance on the retrieved driving route to the driver of the vehicle; a second route guidance unit configured to offer guidance on the autonomous driving information required to reach the input destination if the vehicle is set to autonomous driving mode; and a communication unit configured to, if the vehicle is set to autonomous driving mode, send the autonomous driving information to the information provision unit, or receive the behavior information from the adjacent vehicle or the terminal of the pedestrian via the information provision unit and incorporate the received behavior information into the autonomous driving information.

The second route guidance unit may indicate that current driving mode is autonomous driving mode, may display driving route information and driving environment information, and may display current driving information and subsequent driving information.

The information provision unit may include a user information management unit configured to register and manage user information of the navigation unit, the navigator of the adjacent vehicle, and the navigator of the terminal of the pedestrian; a location management unit configured to manage location information of the navigation unit, the navigator of the adjacent vehicle, and the navigator of the terminal of the pedestrian; a route search unit configured to provide the navigation unit, the navigator of the adjacent vehicle and the navigator of the terminal of the pedestrian with the driving route into which traffic information has been incorporated; and a communication connection unit configured to relay the autonomous driving information and the behavior information by establishing communication among the navigation unit, the navigator of the adjacent vehicle and the navigator of the terminal of the pedestrian.

The communication connection unit may include a first collection unit configured to collect the autonomous driving information transmitted by the navigation unit; a second collection unit configured to collect the behavior information transmitted by the navigator of the adjacent vehicle or the navigator of the terminal of the pedestrian; a first transmission unit configured to receive a request for the behavior information of the adjacent vehicle or the pedestrian from the navigation unit, and to send the behavior information of the adjacent vehicle or the pedestrian to the navigation unit; and a second transmission unit configured to receive a request for the autonomous driving information of the vehicle from the navigator of the adjacent vehicle or the navigator of the terminal of the pedestrian, and to send the autonomous driving information of the vehicle to the navigator of the adjacent vehicle or the navigator of the terminal of the pedestrian.

The navigator of the adjacent vehicle may send the behavior information to the information provision unit or may receive the autonomous driving information from the vehicle or the behavior information from the terminal of the pedestrian.

In accordance with another aspect of the present invention, there is provided an autonomous driving control method using navigation technology, including setting, by a driving mode setting unit, driving mode of a vehicle; providing, by a navigation unit, guidance on a driving route to a destination input by a driver of the vehicle based on the set driving mode; and providing, by an information provision unit, a navigator of an adjacent vehicle and a navigator of a terminal of a pedestrian with autonomous driving information received from the vehicle, and providing, by the information provision unit, the navigation unit with behavior information received from the adjacent vehicle and the terminal of the pedestrian if the driving mode of the vehicle is set to autonomous driving mode.

Setting the driving mode may include setting the vehicle to driver driving mode in which the vehicle is manually driven by the driver; and setting the vehicle to autonomous driving mode in which the vehicle operates autonomously.

Setting the vehicle to the autonomous driving mode in which the vehicle operates autonomously may include recognizing the autonomous driving information required to reach the destination input to the navigation unit by the driver of the vehicle; controlling driving devices of the vehicle based on the autonomous driving information; and providing the autonomous driving information to the navigation unit.

Controlling the driving devices of the vehicle based on the autonomous driving information may include controlling flickering of a direction indication lamp or a brake lamp of the vehicle based on the autonomous driving information; and displaying the autonomous driving information on display means attached to a windshield of the vehicle, and controlling an output of a sentence, prompting a pedestrian to cross a road, to the display means attached to the windshield of the vehicle if the autonomous driving information corresponds to a wait for a pedestrian.

Offering guidance on the driving route to the destination input by the driver of the vehicle based on the set driving mode may include receiving the destination from the driver of the vehicle; searching for the driving route to the input destination based on previously stored driver driving information if the vehicle is set to driver driving mode, and offering guidance on the retrieved driving route to the driver of the vehicle; offering guidance on the autonomous driving information required to reach the input destination if the vehicle is set to autonomous driving mode; and, if the vehicle is set to autonomous driving mode, sending the autonomous driving information to the information provision unit, or receiving the behavior information, received from the adjacent vehicle or the terminal of the pedestrian, from the information provision unit and also incorporating the received behavior information into the autonomous driving information.

Offering guidance on the autonomous driving information required to reach the input destination may include indicating that current driving mode is autonomous driving mode, displaying driving route information and driving environment information, and displaying current driving information and subsequent driving information.

Providing the navigator of the adjacent vehicle and the navigator of the terminal of the pedestrian with the autonomous driving information received from the vehicle, and providing the navigation unit with the behavior information received from the adjacent vehicle and the terminal of the pedestrian, if the driving mode of the vehicle is set to the autonomous driving mode, may include registering and managing the user information of the navigation unit, the navigator of the adjacent vehicle and the navigator of the terminal of the pedestrian; managing the location information of the navigation unit, the navigator of the adjacent vehicle and the navigator of the terminal of the pedestrian;

providing the navigation unit, the navigator of the adjacent vehicle, and the navigator of the terminal of the pedestrian with the driving route into which traffic information has been incorporated; and relaying the autonomous driving information and the behavior information by establishing communication among the navigation unit, the navigator of the adjacent vehicle, and the navigator of the terminal of the pedestrian.

Relaying the autonomous driving information and the behavior information by establishing the communication among the navigation unit, the navigator of the adjacent vehicle, and the navigator of the terminal of the pedestrian may include collecting the autonomous driving information transmitted by the navigation unit; collecting the behavior information transmitted by the navigator of the adjacent vehicle or the navigator of the terminal of the pedestrian; receiving a request for the behavior information of the adjacent vehicle or the pedestrian from the navigation unit, and sending the behavior information of the adjacent vehicle or the pedestrian to the navigation unit; and receiving a request for the autonomous driving information of the vehicle from the navigator of the adjacent vehicle or the navigator of the terminal of the pedestrian, and sending the autonomous driving information of the vehicle to the navigator of the adjacent vehicle or the navigator of the terminal of the pedestrian.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
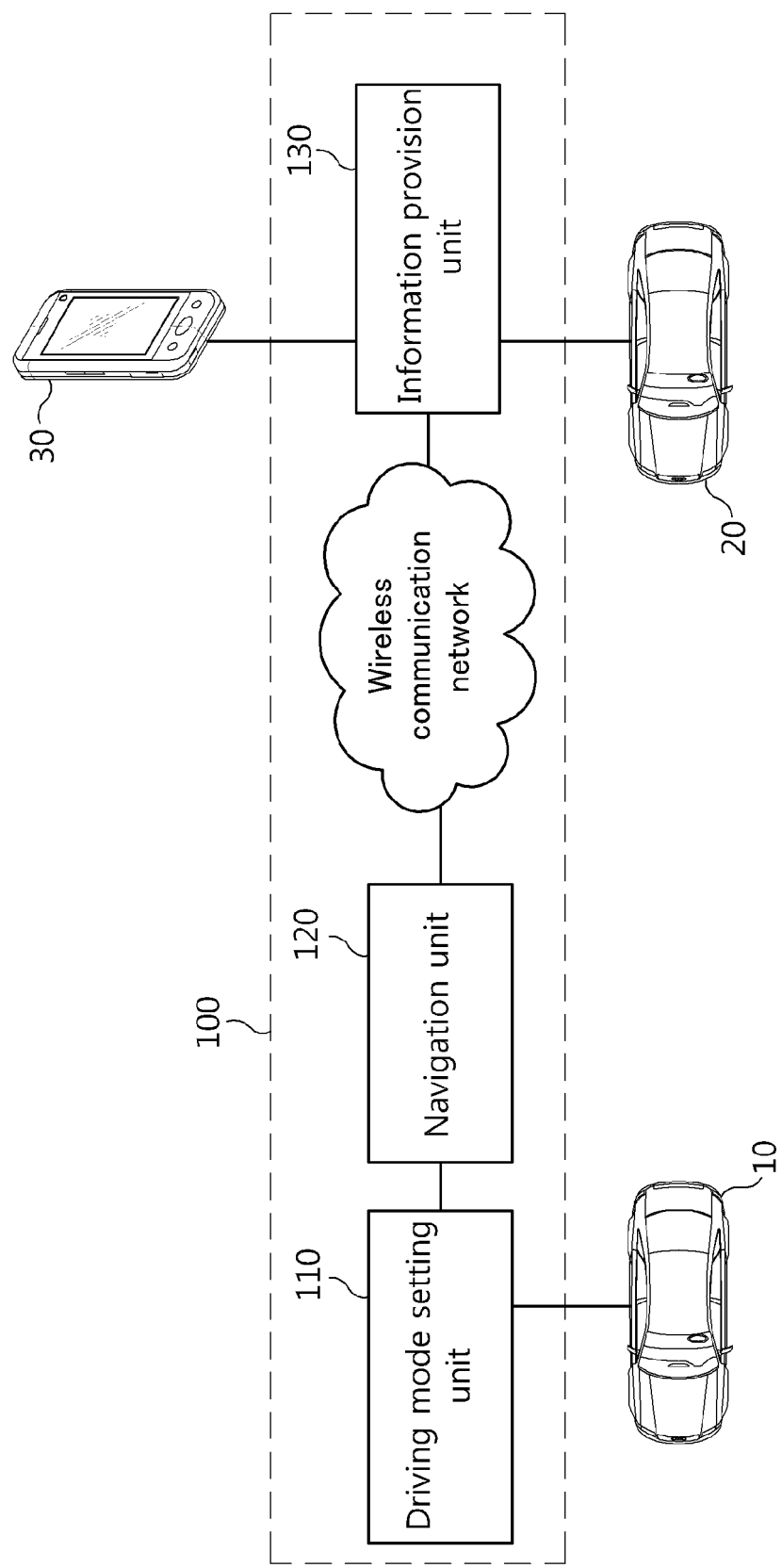
FIG. 1 is a diagram illustrating the configuration of an autonomous driving control apparatus using navigation technology according to an embodiment of the present invention.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

An autonomous driving control apparatus and method using navigation technology according to embodiments of the present invention are described in detail below with reference to the accompanying drawings.

FIG. 1 is a diagram illustrating the configuration of an autonomous driving control apparatus 100 using navigation technology according to an embodiment of the present invention.

Referring to FIG. 1, the autonomous driving control apparatus 100 using navigation technology according to this embodiment of the present invention (hereinafter referred to as an "autonomous driving control apparatus") may basically include a driving mode setting unit 110, a navigation unit 120, and an information provision unit 130.

The driving mode setting unit 110 sets the driving mode of a vehicle 10. The driving mode setting unit 110 may set the vehicle 10 to driver driving mode in which the vehicle 10 is manually driven by a driver or to autonomous driving mode in which the vehicle 10 operates autonomously.

The navigation unit 120 offers guidance on a driving route to an input destination to the driver of the vehicle 10 based on the set driving mode. If a destination is input by the driver of the vehicle 10 and the vehicle 10 is set to driver driving mode, the navigation unit 120 searches for a driving route to the input destination based on previously stored driver driving information, and offers guidance on the retrieved driving route to the driver. If the vehicle 10 is set to autonomous driving mode, the navigation unit 120 offers guidance on autonomous driving information required to reach the input destination. Furthermore, if the vehicle 10 is set to autonomous driving mode, the navigation unit 120 may send autonomous driving information to the information provision unit 130, or may receive behavior information from an adjacent vehicle 20 or the terminal 30 of a pedestrian via the information provision unit 130 and incorporate the behavior information into autonomous driving information when a standstill occurs.

The information provision unit 130 functions as a server that collects information among the vehicle 10, the adjacent vehicle 20, and a pedestrian and provides the information. If the vehicle 10 is set to autonomous driving mode, the information provision unit 130 provides the navigator of the adjacent vehicle 20 and the navigator of the terminal 30 of a pedestrian with the autonomous driving information received from the vehicle 10, and provides the navigation unit 120 with behavior information received from the adjacent vehicle 20 and the terminal 30 of the pedestrian. As described above, the navigator of the adjacent vehicle 20 according to an embodiment of the present invention may send behavior information to the information provision unit 130, or may receive autonomous driving information from the vehicle 10 or behavior information from the terminal 30 of the pedestrian. The navigator of the terminal 30 of the pedestrian may send behavior information to the information provision unit 130, or may receive autonomous driving information from the vehicle 10 or behavior information from the adjacent vehicle 20. For this purpose, the navigator of the adjacent vehicle 20 and the navigator of the terminal 30 of the pedestrian may include a communication unit 124 configured to communicate with the information provision unit 130, a driving route planning unit, and a driving route guidance unit although not illustrated in FIG. 1.

Figure 2:
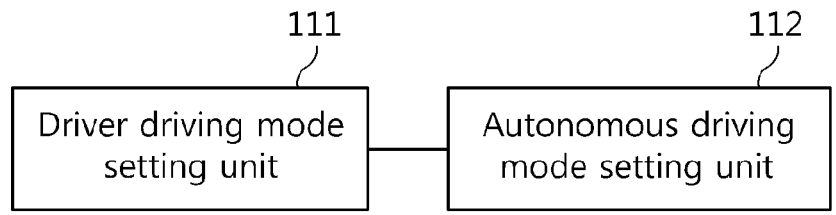
FIG. 2 is a diagram illustrating the detailed configuration of a driving mode setting unit used in the autonomous driving control apparatus according to an embodiment of the present invention.
Figure 3:
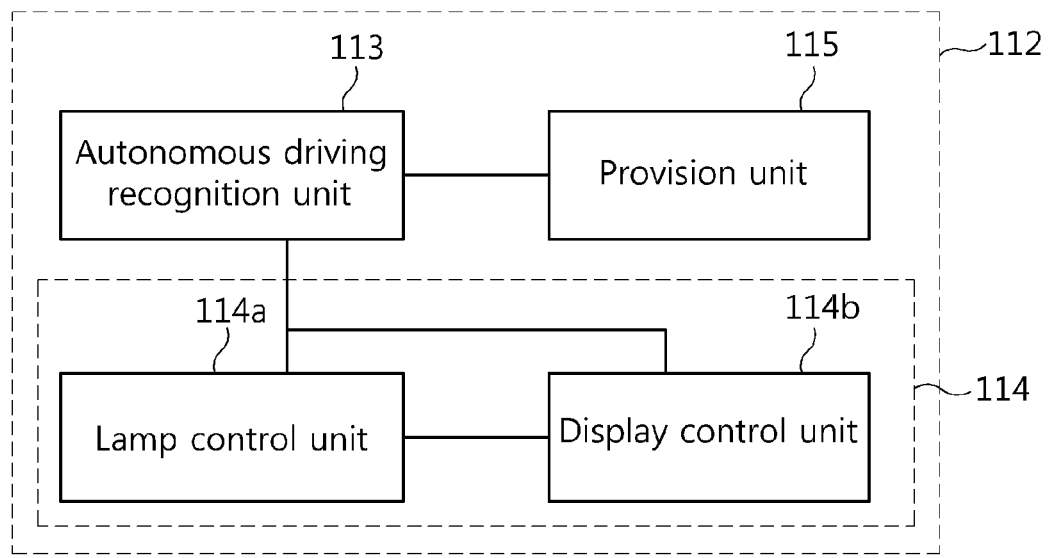
FIG. 3 is a diagram illustrating the detailed configuration of an autonomous driving mode setting unit used in the driving mode setting unit of FIG. 2.

FIG. 2 is a diagram illustrating the detailed configuration of the driving mode setting unit used in the autonomous driving control apparatus according to an embodiment of the present invention, and FIG. 3 is a diagram illustrating the detailed configuration of an autonomous driving mode setting unit used in the driving mode setting unit of FIG. 2.

Referring to FIG. 2, the driving mode setting unit 110 according to an embodiment of the present invention sets driving mode of the vehicle 10.

For this purpose, the driving mode setting unit 110 may include a driver driving mode setting unit 111, and an autonomous driving mode setting unit 112.

The driver driving mode setting unit 111 sets the vehicle 10 to driver driving mode in which the vehicle 10 is manually driven by a driver.

The autonomous driving mode setting unit 112 sets the vehicle 10 to autonomous driving mode in which the vehicle 10 operates autonomously. In this case, the term "autonomous driving" refers to a technology for recognizing a surrounding environment using the function of detecting and processing external information when a vehicle operates, autonomously determining a driving route, and independently driving the vehicle using its power. Furthermore, as illustrated in FIG. 3, the autonomous driving mode setting unit 112 includes an autonomous driving recognition unit 113, an autonomous driving control unit 114, and a provision unit 115.

The autonomous driving recognition unit 113 recognizes autonomous driving information required to reach a destination that has been input to the navigation unit 120 by the driver of the vehicle 10. In this case, the autonomous driving information may include driving environment information, including at least any one of information about the vehicle 20 adjacent to the vehicle 10, information about obstacles, road information and traffic information, driving route information required to reach a destination, and driving information, including information about at least any one of a start, a stop, keeping a lane, a lane change, the direction of the vehicle 10, the speed of the vehicle 10, the passing of an intersection, a point where roads come together, a wait for a pedestrian, a wait for a traffic signal, and an emergency wait.

The autonomous driving control unit 114 controls the driving devices of the vehicle 10 based on the autonomous driving information. The autonomous driving control unit 114 may include a lamp control unit 114a configured to control the flickering of the direction indication lamp or brake lamp of the vehicle 10 based on autonomous driving information, and a display control unit 114b configured to control the output of a sentence, prompting a pedestrian to cross a road, to a display means attached to the windshield of the vehicle 10 if the autonomous driving information corresponds to a wait for a pedestrian. Although not illustrated in the drawings, the autonomous driving control unit 114 may further include a control unit configured to control steering and an acceleration/deceleration actuator in the vehicle.

The provision unit 115 provides the autonomous driving information to the navigation unit 120.

Figure 4:
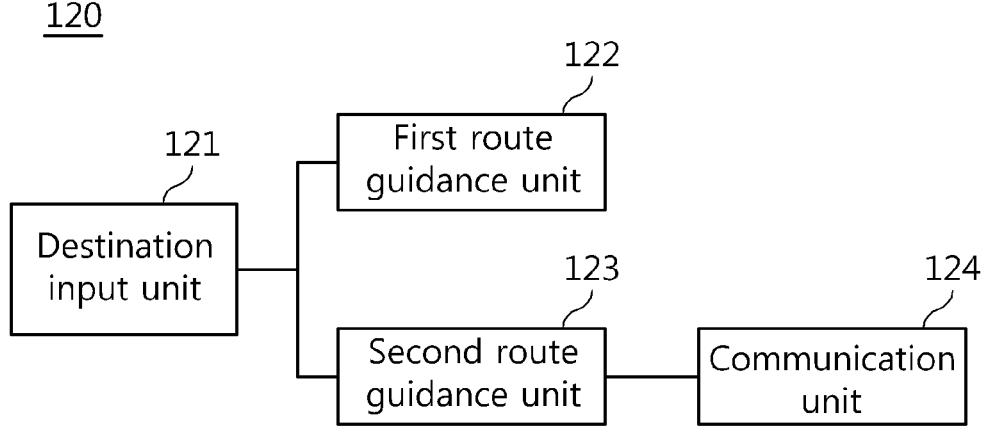
FIG. 4 is a diagram illustrating the detailed configuration of a navigation unit used in the autonomous driving control apparatus according to an embodiment of the present invention.

FIG. 4 is a diagram illustrating the detailed configuration of the navigation unit used in the autonomous driving control apparatus according to an embodiment of the present invention.

Referring to FIG. 4, the navigation unit 120 according to an embodiment of the present invention offers guidance on a driving route to a destination, input by the driver of the vehicle 10, based on the set driving mode.

For this purpose, the navigation unit 120 may include a destination input unit 121, a first route guidance unit 122, a second route guidance unit 123, and a communication unit 124.

The destination input unit 121 receives a destination input by the driver of the vehicle 10.

If the vehicle 10 is set to driver driving mode, the first route guidance unit 122 searches a driving route to the input destination based on previously stored driver driving information, and offers guidance on the retrieved driving route to the driver.

If the vehicle 10 is set to autonomous driving mode, the second route guidance unit 123 offers guidance on autonomous driving information required to reach the input destination. The second route guidance unit 123 indicates that current driving mode is autonomous driving mode on a screen, displays driving route information and driving environment information, and displays current driving information and subsequent driving information, which are described in detail later with reference to FIG. 8.

If the vehicle 10 is set to autonomous driving mode, the communication unit 124 sends autonomous driving information to the information provision unit 130, receives behavior information from the adjacent vehicle 20 or the terminal 30 of a pedestrian via the information provision unit 130, and incorporates the behavior information into autonomous driving information. The communication unit 124 sends user information, received from a user, and information about the location of a navigator, received from location determination means, such as a GPS attached to the navigation unit 120, to the information provision unit 130.

Figure 5:
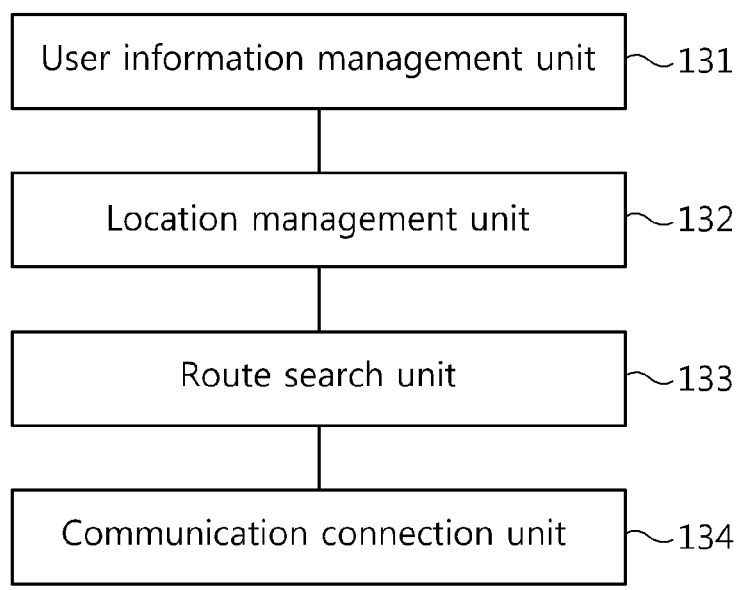
FIG. 5 is a diagram illustrating the detailed configuration of an information provision unit used in the autonomous driving control apparatus according to an embodiment of the present invention.
Figure 6:
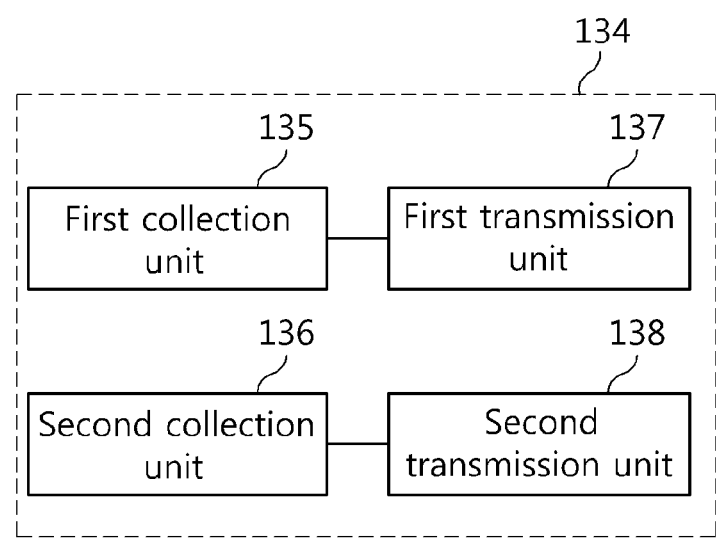
FIG. 6 is a diagram illustrating the detailed configuration of a communication connection unit used in the information provision unit of FIG. 5.

FIG. 5 is a diagram illustrating the detailed configuration of the information provision unit used in the autonomous driving control apparatus according to an embodiment of the present invention, and FIG. 6 is a diagram illustrating the detailed configuration of a communication connection unit used in the information provision unit of FIG. 5.

Referring to FIG. 5, if the vehicle 10 is set to autonomous driving mode, the information provision unit 130 provides the navigator of the adjacent vehicle 20 and the navigator of the terminal 30 of a pedestrian with autonomous driving information received from the vehicle 10, and provides the navigation unit 120 with behavior information received from the adjacent vehicle 20 and the terminal 30 of the pedestrian.

For this purpose, the information provision unit 130 may include a user information management unit 131, a location management unit 132, a route search unit 133, and a communication connection unit 134.

The user information management unit 131 registers and manages the user information of the navigation unit 120 of the vehicle 10, the navigator of the adjacent vehicle 20 and the navigator of the terminal 30 of the pedestrian.

The location management unit 132 manages the location information of the navigation unit 120 of the vehicle 10, the navigator of the adjacent vehicle 20 and the navigator of the terminal 30 of the pedestrian.

The route search unit 133 provides a driving route in which traffic information has been incorporated into the navigation unit 120 of the vehicle 10, the navigator of the adjacent vehicle 20, and the navigator of the terminal 30 of the pedestrian.

The communication connection unit 134 relays autonomous driving information and behavior information by establishing communication among the navigation unit 120 of the vehicle 10, the navigator of the adjacent vehicle 20, and the navigator of the terminal 30 of a pedestrian.

As illustrated in FIG. 6, the communication connection unit 134 may include a first collection unit 135, a second collection unit 136, a first transmission unit 137, and a second transmission unit 138.

The first collection unit 135 collects autonomous driving information transmitted by the navigation unit 120.

The second collection unit 136 collects behavior information transmitted by the navigator of the adjacent vehicle 20 or the navigator of the terminal 30 of a pedestrian.

The first transmission unit 137 receives a request for information about the behavior of the adjacent vehicle 20 or the pedestrian from the navigation unit 120, and sends the information about the behavior of the adjacent vehicle 20 or the pedestrian to the navigation unit 120.

The second transmission unit 138 receives a request for autonomous driving information regarding the vehicle 10 from the navigator of the adjacent vehicle 20 or the navigator of the terminal 30 of the pedestrian, and sends the autonomous driving information of the vehicle 10 to the navigator of the adjacent vehicle 20 or the navigator of the terminal 30 of the pedestrian.

Figure 7:
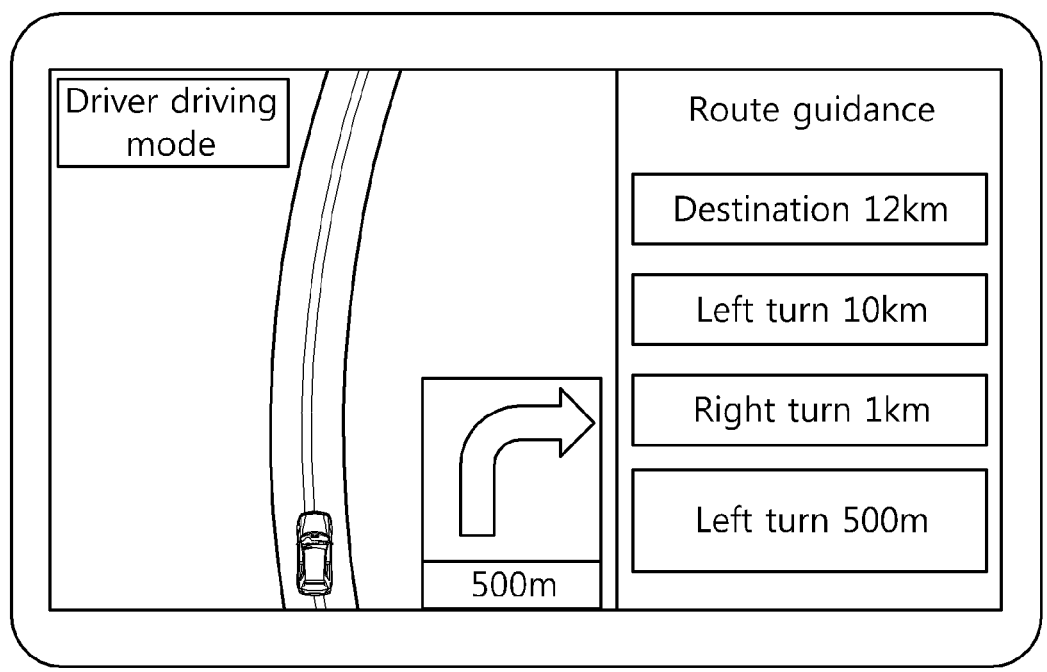
FIG. 7 is a diagram illustrating the configuration of the screen of the navigation unit when driver driving mode is set according to an embodiment of the present invention.
Figure 8:
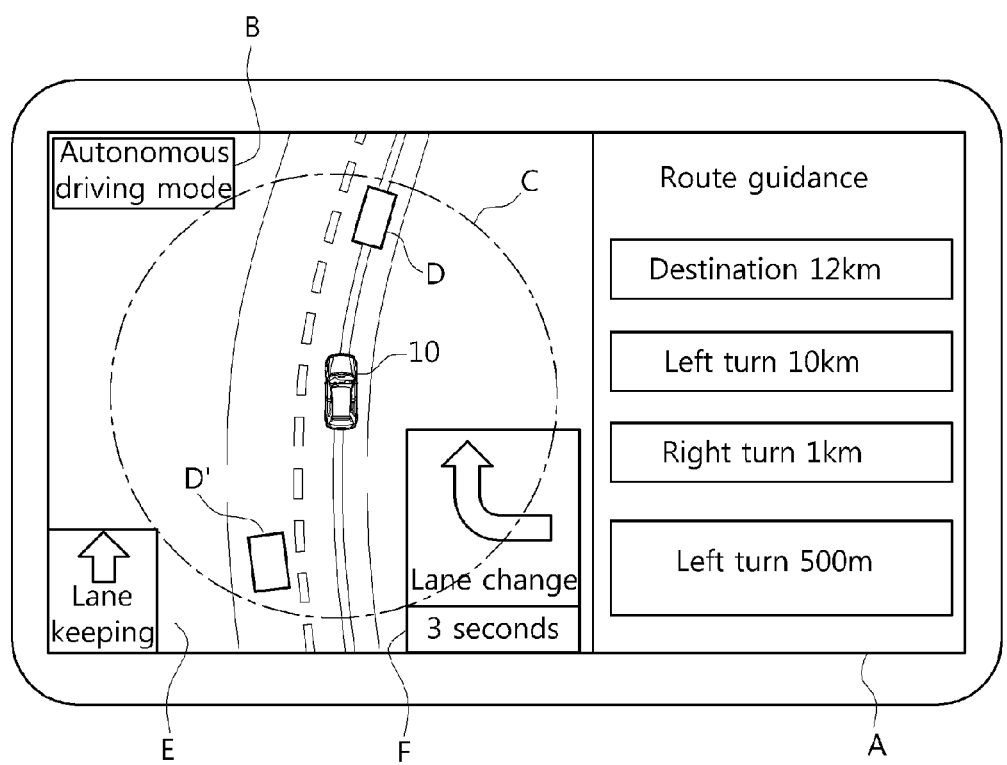
FIG. 8 is a diagram illustrating the configuration of the screen of the navigation unit when autonomous driving mode is set according to an embodiment of the present invention.

FIG. 7 is a diagram illustrating the configuration of the screen of the navigation unit when driver driving mode is set according to an embodiment of the present invention, and FIG. 8 is a diagram illustrating the configuration of the screen of the navigation unit when autonomous driving mode is set according to an embodiment of the present invention.

In accordance with an embodiment of the present invention, when driver driving mode is set, the screen of the navigation unit 120 indicates that the driving mode is driver driving mode in the top left position, as illustrated in FIG. 7, and route guidance is performed in the same manner as that of a common navigator.

In accordance with an embodiment of the present invention, if driving mode is changed to autonomous driving mode because a driver presses an autonomous driving start button or voice-instructs the driving mode to be changed to autonomous driving mode, the driving mode is changed to autonomous driving mode, as illustrated in FIG. 8, and thus a guidance method changes. Since a driver does not directly drive a vehicle in autonomous driving mode, the driver is informed of the current status of the autonomous driving mode and information about subsequent driving, rather than road guidance along a route, thereby increasing a possibility of prediction. In the configuration of the screen, the screen of FIG. 8 is split into two. On the right side (i.e., a route guidance display region A) of the screen, a driving route used to determine an overall route is displayed and main turning points are indicated based on the distance. On the left side of the screen, a driving environment and driving information are displayed in the form of a map. Furthermore, the autonomous driving mode is indicated in a driving mode display region B at the top on the left side, thereby providing notification that the vehicle is in autonomous driving mode. Furthermore, the map is changed up to a lane level so that the lanes of a road are displayed (in common driving mode, a road is not displayed up to a lane level, unlike in a conventional navigator), and the location of the vehicle 10 is moved to the center of the screen (or a point corresponding to ⅔ of the height of the screen). In a conventional common navigator, the location of the vehicle 10 is displayed at the bottom of a screen because a driver performs recognition and determination. In contrast, in the autonomous driving mode, the location of the vehicle 10 is displayed at the center of a screen in order to display information about the driving environment of the vehicle 10 because recognition and determination are performed based on autonomous driving information. Furthermore, a recognition range C based on sensors mounted on the vehicle 10 is indicated by a circle, and obstacles D and D', such as the adjacent vehicle 20 and the pedestrian, are indicated by squares. Furthermore, the greatest difference between the present invention and a conventional navigator is that a current driving information display region E and a subsequent driving information display region F are displayed on the left bottom and the right bottom. The current driving information display region indicates a driving behavior that is now being performed in the autonomous driving mode, and also provides notification that the vehicle 10 is now being driven along the lane of the vehicle 10. The subsequent driving information display region is indicative of a driving behavior that will be taken later (e.g., in several seconds) in the autonomous driving mode. In this case, guidance on the autonomous driving information is not offered according to the distance as in a conventional navigator, but the autonomous driving information may be displayed in an image form, as illustrated in FIG. 8. Using the above screen configuration, a driver may periodically monitor whether or not current driving conditions are appropriately recognized and determined in the autonomous driving mode. If the recognition and determination of the driver are different from those in autonomous driving mode, the driver may change the driving mode from autonomous driving mode to driver driving mode and directly drive the vehicle 10.

Figure 9:
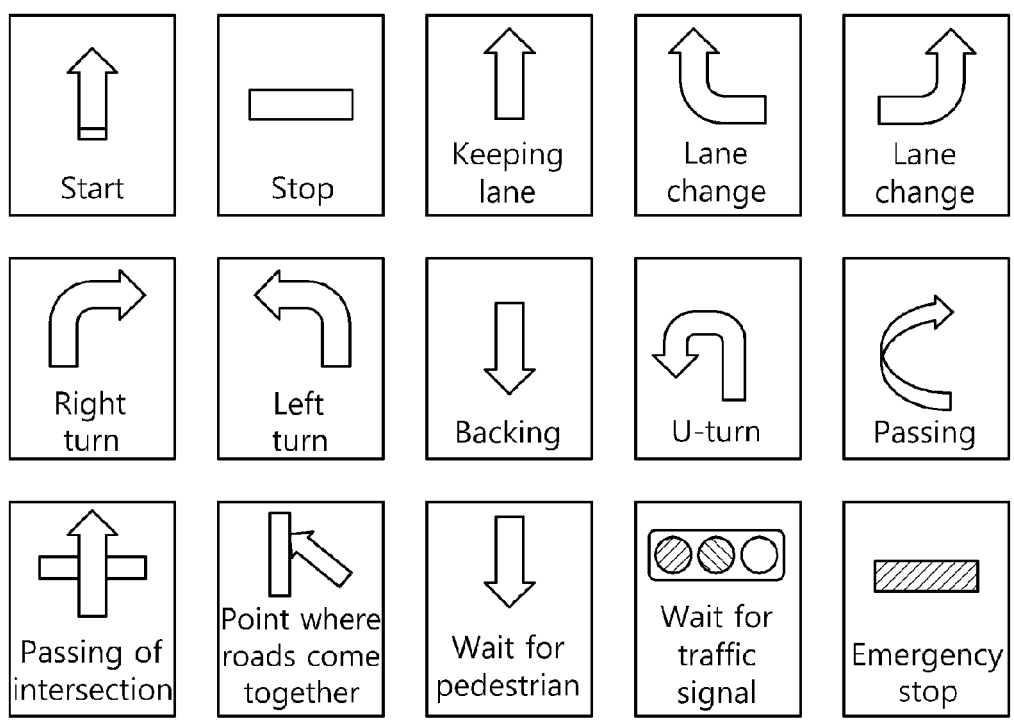
FIG. 9 is a diagram illustrating the types of autonomous driving information that are displayed when autonomous driving mode is set in an embodiment of the present invention.

FIG. 9 is a diagram illustrating the types of autonomous driving information that are displayed when autonomous driving mode is set in an embodiment of the present invention.

Referring to FIG. 9, the autonomous driving information according to an embodiment of the present invention may include driving environment information, including at least any one of information about the vehicle 20 adjacent to the vehicle 10, information about obstacles, road information and traffic information, driving route information required to reach a destination, and driving information, including information about at least any one of a start, a stop, keeping a lane, a lane change, the direction of the vehicle 10, the speed of the vehicle 10, the passing of an intersection, a point where roads come together, a wait for a pedestrian, a wait for a traffic signal, and an emergency wait. Images of such information are illustrated in FIG. 9.

Figure 10:
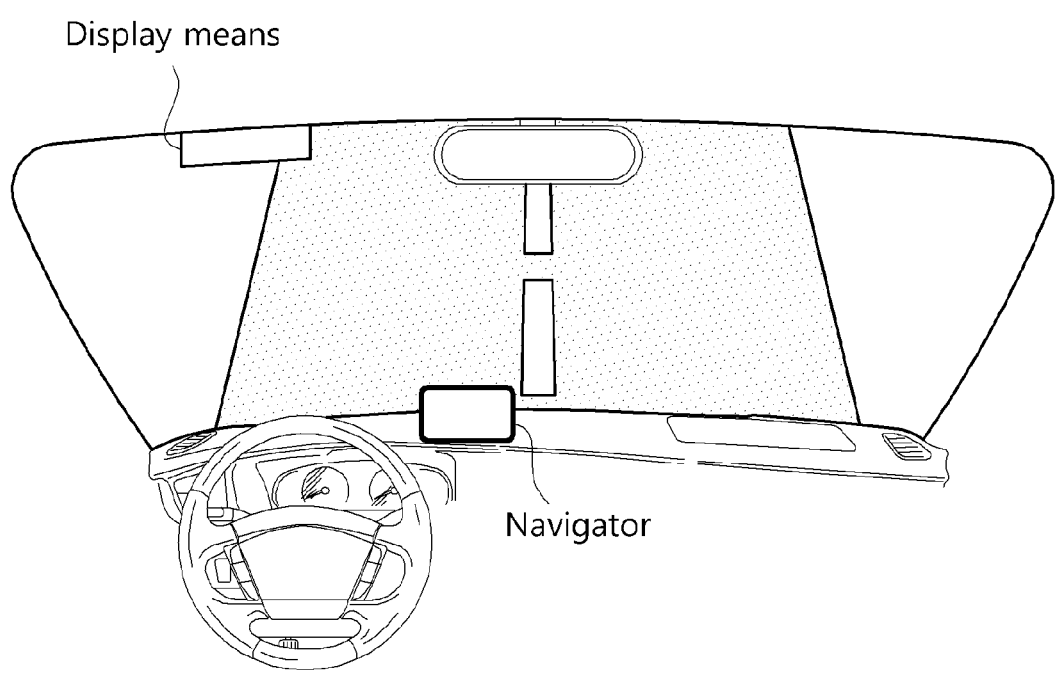
FIG. 10 is a diagram illustrating a display means provided on the front part of a vehicle according to an embodiment of the present invention.

FIG. 10 is a diagram illustrating a display means provided on the front part of the vehicle 10 according to an embodiment of the present invention.

Referring to FIG. 10, methods by which the vehicle 10 set to autonomous driving mode according to an embodiment of the present invention provides its future driving behavior to the adjacent vehicle 20 may be classified into two types of methods. In the first type of method, the vehicle 10 may notify the adjacent vehicle 20 of its future driving behavior by controlling the flickering of a direction indication lamp and a brake lamp via the autonomous driving control unit 114. In the second type of method, the navigation unit 120 of the vehicle 10 may provide autonomous driving information to the adjacent vehicle 20 via the information provision unit 130. That is, when the navigation unit 120 of the vehicle 10 sends autonomous driving information to the information provision unit 130, the information provision unit 130 may collect the autonomous driving information, and may send the autonomous driving information to the navigator of the vehicle 20 adjacent to the vehicle 10.

Furthermore, methods by which the vehicle 10 set to autonomous driving mode provides its future driving behavior to the pedestrian may be classified into two types. In the first type of method, in order to replace eye contact or a hand signal between the driver of the vehicle 10 and the pedestrian, an outward display means may be attached to the top of a windshield on the driver's seat side, as illustrated in FIG. 10. This has been devised based on an understanding of the fact that most pedestrians establish eye contact with the driver of the vehicle when they cross a road. That is, the vehicle 10 may display autonomous driving information, such as those illustrated in FIG. 9, on the display means via the autonomous driving control unit 114. If the autonomous driving information corresponds to a wait for a pedestrian, the vehicle 10 may perform control so that a sentence, prompting a pedestrian to cross a road, is output. In the second type of method, in the case where the vehicle 10 waits until a pedestrian crosses a road, the pedestrian continues to wait because he or she does not anticipate the behavior of the vehicle 10 and thus a standstill occurs, when the navigation unit 120 of the vehicle 10 sends autonomous driving information to the information provision unit 130, the information provision unit 130 may collect the autonomous driving information and then send the autonomous driving information to the navigator of the terminal 30 of the pedestrian.

Figure 11:
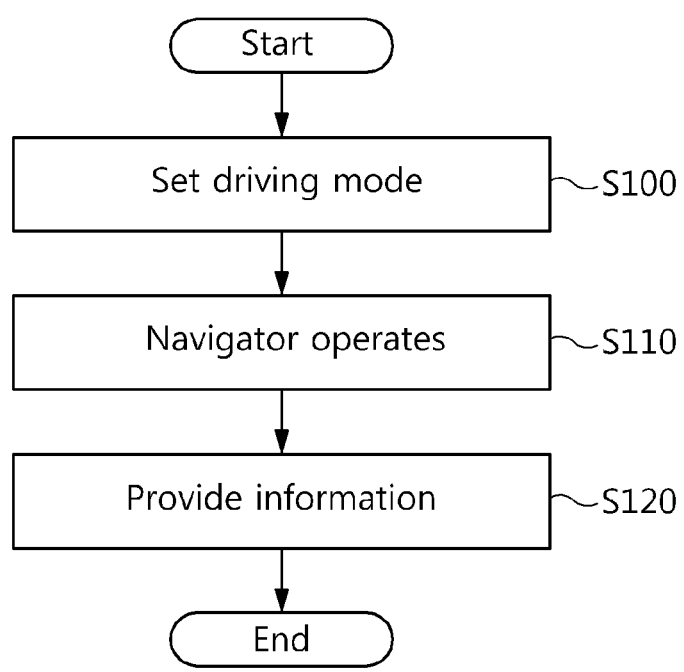
FIG. 11 is a flowchart illustrating an autonomous driving control method according to an embodiment of the present invention.

FIG. 11 is a flowchart illustrating an autonomous driving control method according to an embodiment of the present invention.

Referring to FIG. 11, the autonomous driving control method according to this embodiment of the present invention is performed using the autonomous driving control apparatus, and redundant descriptions are omitted.

First, the driving mode of the vehicle 10 is set at step S100.

Thereafter, guidance on a driving route to a destination input by the driver of the vehicle 10 is offered based on the set driving mode at step S110.

Thereafter, if the vehicle 10 is set to autonomous driving mode, autonomous driving information received from the vehicle 10 is provided to the navigator of the adjacent vehicle 20 and the navigator of the terminal 30 of the pedestrian, and behavior information received from the adjacent vehicle 20 and the terminal 30 of the pedestrian is provided to the navigation unit 120 at step S120.

Figure 12:
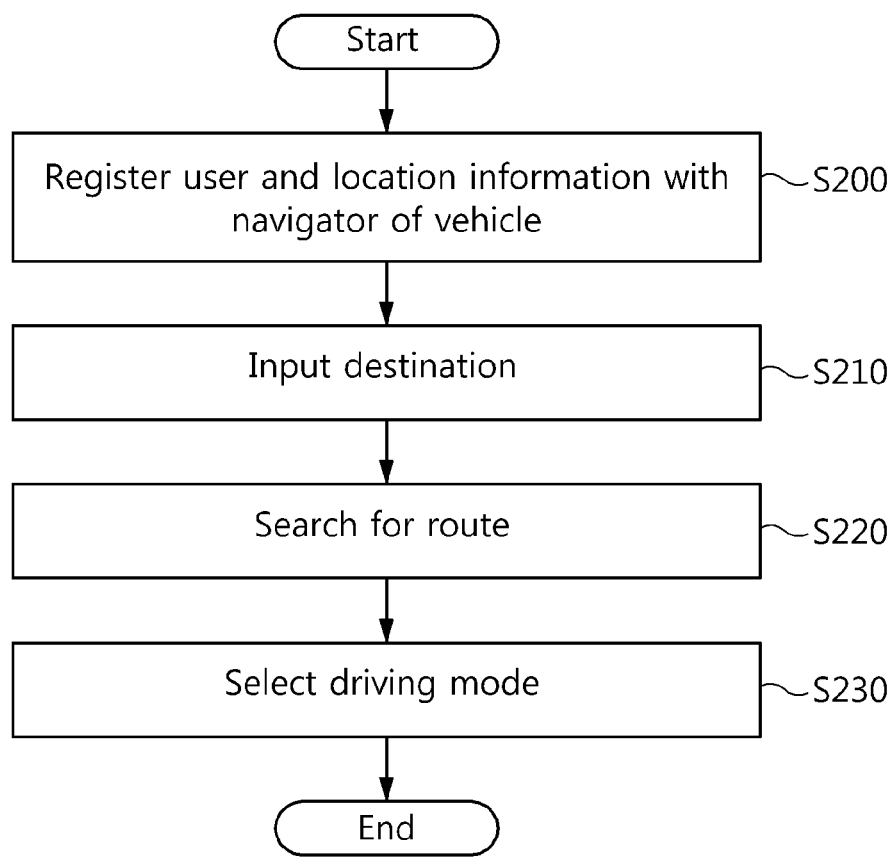
FIG. 12 is a diagram illustrating a process of setting driving mode in the autonomous driving control method according to an embodiment of the present invention.

FIG. 12 is a diagram illustrating a process of setting driving mode in the autonomous driving control method according to an embodiment of the present invention.

Referring to FIG. 12, in the process of setting driving mode according to this embodiment of the present invention, first, the user information of the navigation unit 120 of the vehicle 10, the navigator of the adjacent vehicle 20 and the navigator of the terminal 30 of the pedestrian and the location information of the navigation unit 120 of the vehicle 10, the navigator of the adjacent vehicle 20, and the navigator of the terminal 30 of the pedestrian are registered at step S200.

Thereafter, the driver of the vehicle 10 inputs a destination to the navigation unit 120 of the vehicle 10 at step S210.

Thereafter, a driving route to the input destination is searched for at step S220.

Thereafter, the driver of the vehicle 10 sets the driving mode of the vehicle 10 at step S230. At step S230, the driver may set the vehicle 10 to driver driving mode in which the vehicle 10 is manually driven by the driver or to autonomous driving mode in which the vehicle 10 autonomously operates.

Figure 13:
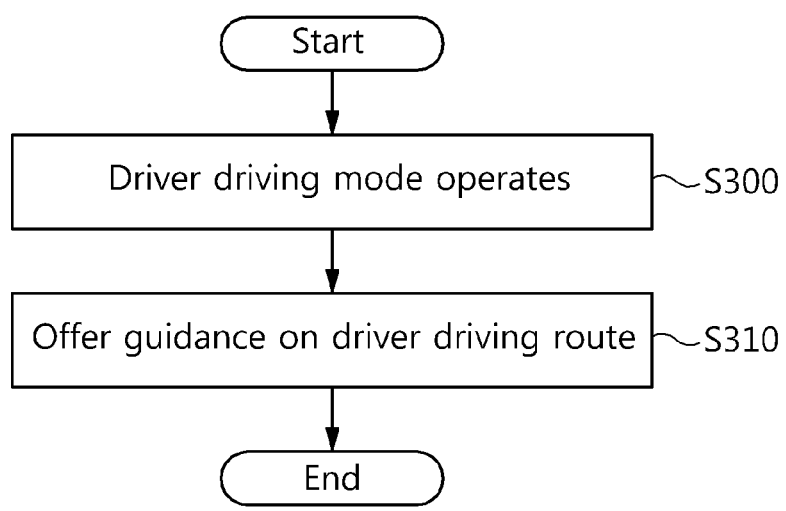
FIG. 13 is a diagram illustrating a process of offering route guidance when driver driving mode is set in the autonomous driving control method according to an embodiment of the present invention.

FIG. 13 is a diagram illustrating a process of offering route guidance when driver driving mode is set in the autonomous driving control method according to an embodiment of the present invention.

Referring to FIG. 13, in the process of offering route guidance when driver driving mode is set according to an embodiment of the present invention, first, the vehicle 10 operates in driver driving mode at step S300. At step S300, the driver of the vehicle 10 sets the vehicle 10 to driver driving mode.

Thereafter, when the vehicle 10 is set to driver driving mode, a driving route to an input destination is searched for based on previously stored driver driving information, and guidance on the retrieved driving route is offered to the driver at step S310.

Figure 14:
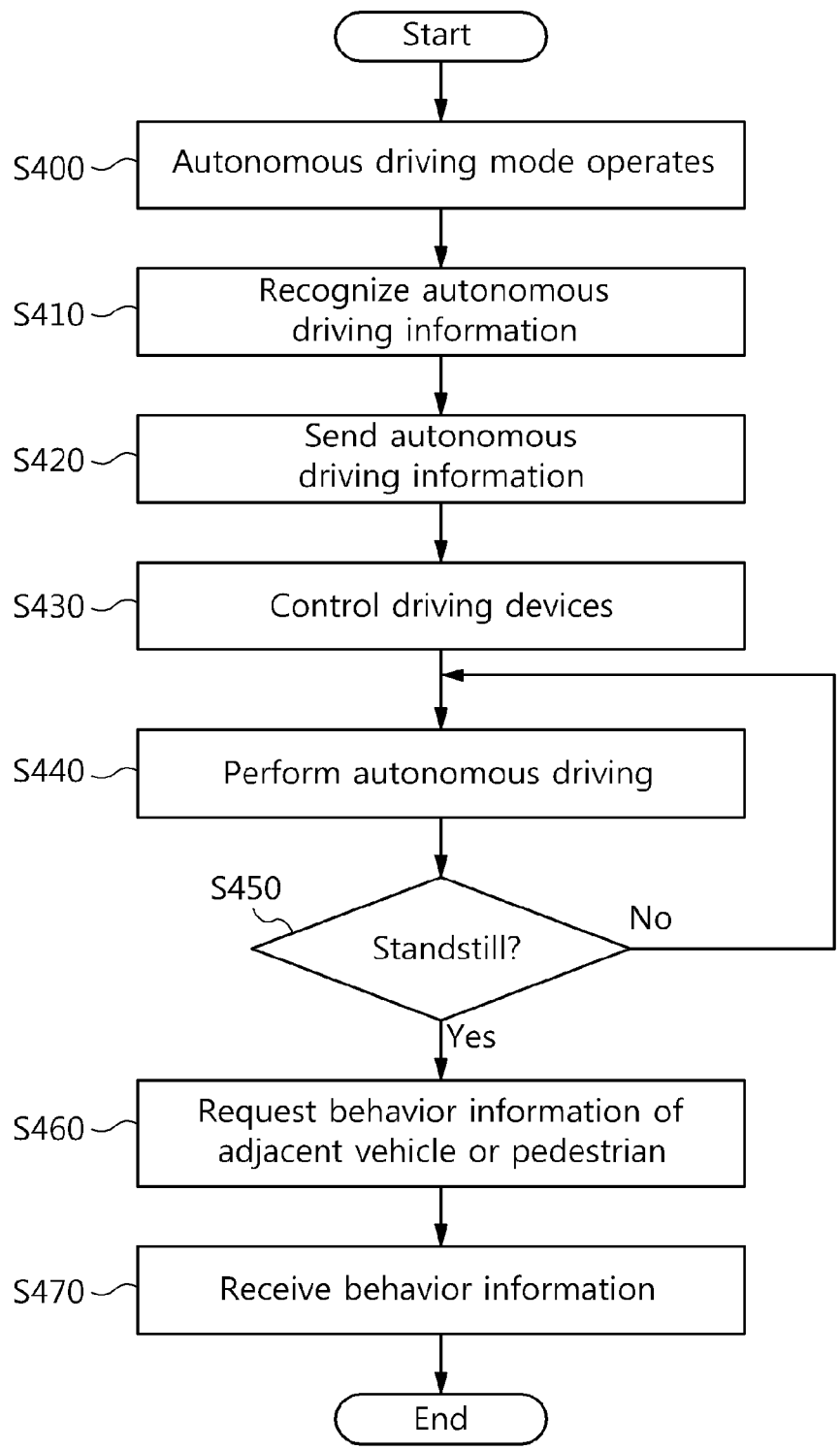
FIG. 14 is a diagram illustrating a process of offering route guidance when autonomous driving mode is set in the autonomous driving control method according to an embodiment of the present invention.

FIG. 14 is a diagram illustrating a process of offering route guidance when autonomous driving mode is set in the autonomous driving control method according to an embodiment of the present invention.

Referring to FIG. 14, in the process of offering route guidance when autonomous driving mode is set according to this embodiment of the present invention, first, the vehicle 10 operates in autonomous driving mode at step S400. At step S400, the driver sets the vehicle 10 to autonomous driving mode.

Thereafter, autonomous driving information is recognized at step S410. At step S410, the autonomous driving information may include driving environment information, including at least any one of information about the vehicle 20 adjacent to the vehicle 10, information about obstacles, road information and traffic information, driving route information required to reach a destination, and driving information, including information about at least any one of a start, a stop, keeping a lane, a lane change, the direction of the vehicle 10, the speed of the vehicle, the passing of an intersection, a point where roads come together, a wait for a pedestrian, a wait for a traffic signal, and an emergency wait.

Thereafter, the autonomous driving information is transmitted at step S420.

Thereafter, the driving devices of the vehicle 10 are controlled based on the autonomous driving information at step S430. At step S430, the flickering of the direction indication lamp or brake lamp of the vehicle 10 may be controlled based on the autonomous driving information. Alternatively, if the autonomous driving information corresponds to a wait for a pedestrian, the output of a sentence, prompting the pedestrian to cross a road, to the display means attached to the windshield of the vehicle 10 may be controlled.

Thereafter, guidance on the autonomous driving information is offered based on the autonomous driving information at step S440.

Thereafter, whether or not a standstill has occurred is determined at step S450. If, as a result of the determination at step S450, it is determined that a standstill has not occurred, the process returns to step S440.

Thereafter, if a standstill has occurred, information about the behavior of the adjacent vehicle or the pedestrian is requested at step S450.

Thereafter, the received information about the behavior of the adjacent vehicle or the pedestrian is incorporated into the autonomous driving information at step S460.

As described above, the autonomous driving control apparatus and method using navigation technology according to some embodiments of the present invention have the advantage of utilizing navigation technology as a communication means for providing an adjacent vehicle and a pedestrian with current driving information and future driving information regarding a vehicle that is being driven in autonomous driving mode, thereby maximizing the convenience of the provision of information.

The autonomous driving control apparatus and method using navigation technology according to some embodiments of the present invention have the advantage of, in autonomous driving mode, transmitting autonomous driving information regarding a vehicle to the navigator of an adjacent vehicle via a server and receiving information about the behavior of the adjacent vehicle via the navigator of the vehicle, thereby enabling the driver of a vehicle, the driver of an adjacent vehicle and a pedestrian to communicate with each other, with the result that traffic congestion and traffic accidents are reduced and thus a traffic environment can be improved.

The autonomous driving control apparatus and method using navigation technology according to some embodiments of the present invention have the advantage of, in autonomous driving mode, outputting a sentence, prompting a pedestrian to cross a road, to a display means attached to the windshield of a vehicle when the pedestrian waits at an entrance of a crosswalk, thereby improving the safety of a driver and a pedestrian.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An autonomous driving control apparatus using navigation technology, comprising:
   a driving mode setting unit configured to set driving mode of a vehicle;
   a navigation unit configured to offer guidance on a driving route to a destination input by a driver of the vehicle based on the set driving mode;
   an information provision unit configured to, if the driving mode of the vehicle is set to autonomous driving mode, provide a navigator of an adjacent vehicle and a navigator of a terminal of a pedestrian with autonomous driving information received from the vehicle and also provide the navigation unit with behavior information received from the adjacent vehicle and the terminal of the pedestrian; and
   a display control unit configured to display the autonomous driving information on display means attached to a windshield of the vehicle;
   wherein a display of the navigation unit, in response to a change in the driving mode from a driver driving mode to the autonomous driving mode, changes a map displayed on the display of the navigation unit to show new information, the new information including information at a lane level.

2. The autonomous driving control apparatus of claim 1, wherein the autonomous driving information comprises driving environment information, including at least any one of the adjacent vehicle, obstacles, road information and traffic information, driving route information required to reach the destination, and driving information, including information about at least any one of a start, a stop, keeping a lane, a lane change, a direction of the vehicle, a speed of the vehicle, passing of an intersection, a point where roads come together, a wait for a pedestrian, a wait for a traffic signal, and an emergency wait.

3. The autonomous driving control apparatus of claim 1, wherein the driving mode setting unit comprises:
   a driver driving mode setting unit configured to set the vehicle to driver driving mode in which the vehicle is manually driven by the driver; and
   an autonomous driving mode setting unit configured to set the vehicle to autonomous driving mode in which the vehicle operates autonomously.

4. The autonomous driving control apparatus of claim 3, wherein the autonomous driving mode setting unit comprises:
   an autonomous driving recognition unit configured to recognize the autonomous driving information required to reach the destination input to the navigation unit by the driver of the vehicle;
   an autonomous driving control unit configured to control driving devices of the vehicle based on the autonomous driving information; and
   a provision unit configured to provide the autonomous driving information to the navigation unit.

5. The autonomous driving control apparatus of claim 4, wherein the autonomous driving control unit comprises:
   a lamp control unit configured to control flickering of a direction indication lamp or a brake lamp of the vehicle based on the autonomous driving information; and
   the display control unit.

6. The autonomous driving control apparatus of claim 5, wherein the display control unit controls an output of a sentence, prompting a pedestrian to cross a road, to the display means attached to the windshield of the vehicle if the autonomous driving information corresponds to a wait for a pedestrian.

7. The autonomous driving control apparatus of claim 1, wherein the navigation unit comprises:
   a destination input unit configured to receive the destination from the driver of the vehicle;
   a first route guidance unit configured to search for the driving route to the input destination based on previously stored driver driving information if the vehicle is set to driver driving mode, and to offer guidance on the retrieved driving route to the driver of the vehicle;
   a second route guidance unit configured to offer guidance on the autonomous driving information required to reach the input destination if the vehicle is set to autonomous driving mode; and a communication unit configured to, if the vehicle is set to autonomous driving mode, send the autonomous driving information to the information provision unit, or receive the behavior information from the adjacent vehicle or the terminal of the pedestrian via the information provision unit and incorporate the received behavior information into the autonomous driving information.

8. The autonomous driving control apparatus of claim 7, wherein the second route guidance unit indicates that current driving mode is autonomous driving mode, displays driving route information and driving environment information, and displays current driving information and subsequent driving information.

9. The autonomous driving control apparatus of claim 1, wherein the information provision unit comprises:

a user information management unit configured to register and manage user information of the navigation unit, the navigator of the adjacent vehicle, and the navigator of the terminal of the pedestrian;

a location management unit configured to manage location information of the navigation unit, the navigator of the adjacent vehicle, and the navigator of the terminal of the pedestrian;

a route search unit configured to provide the navigation unit, the navigator of the adjacent vehicle and the navigator of the terminal of the pedestrian with the driving route into which traffic information has been incorporated; and a communication connection unit configured to relay the autonomous driving information and the behavior information by establishing communication among the navigation unit, the navigator of the adjacent vehicle and the navigator of the terminal of the pedestrian.

10. The autonomous driving control apparatus of claim 9, wherein the communication connection unit comprises:

a first collection unit configured to collect the autonomous driving information transmitted by the navigation unit;

a second collection unit configured to collect the behavior information transmitted by the navigator of the adjacent vehicle or the navigator of the terminal of the pedestrian;

a first transmission unit configured to receive a request for the behavior information of the adjacent vehicle or the pedestrian from the navigation unit, and to send the behavior information of the adjacent vehicle or the pedestrian to the navigation unit; and a second transmission unit configured to receive a request for the autonomous driving information of the vehicle from the navigator of the adjacent vehicle or the navigator of the terminal of the pedestrian, and to send the autonomous driving information of the vehicle to the navigator of the adjacent vehicle or the navigator of the terminal of the pedestrian.

11. The autonomous driving control apparatus of claim 1, wherein the navigator of the adjacent vehicle sends the behavior information to the information provision unit or receives the autonomous driving information from the vehicle or the behavior information from the terminal of the pedestrian.

12. An autonomous driving control method using navigation technology, comprising:

setting, by a driving mode setting unit, driving mode of a vehicle;

providing, by a navigation unit, guidance on a driving route to a destination input by a driver of the vehicle based on the set driving mode;

providing, by an information provision unit, a navigator of an adjacent vehicle and a navigator of a terminal of a pedestrian with autonomous driving information received from the vehicle, and providing, by the information provision unit, the navigation unit with behavior information received from the adjacent vehicle and the terminal of the pedestrian if the driving mode of the vehicle is set to autonomous driving mode; and displaying the autonomous driving information on display means attached to a windshield of the vehicle;

wherein the displaying the autonomous driving information on the display means includes displaying information to visually prompt a pedestrian.

13. The autonomous driving control method of claim 12, wherein setting the driving mode comprises:

setting the vehicle to driver driving mode in which the vehicle is manually driven by the driver; and setting the vehicle to autonomous driving mode in which the vehicle operates autonomously.

14. The autonomous driving control method of claim 13, wherein setting the vehicle to the autonomous driving mode in which the vehicle operates autonomously comprises:

recognizing the autonomous driving information required to reach the destination input to the navigation unit by the driver of the vehicle;

controlling driving devices of the vehicle based on the autonomous driving information; and providing the autonomous driving information to the navigation unit.

15. The autonomous driving control method of claim 13, wherein controlling the driving devices of the vehicle based on the autonomous driving information comprises:

controlling flickering of a direction indication lamp or a brake lamp of the vehicle based on the autonomous driving information; and controlling an output of a sentence, prompting a pedestrian to cross a road, to the display means attached to the windshield of the vehicle if the autonomous driving information corresponds to a wait for a pedestrian.

16. The autonomous driving control method of claim 12, wherein offering guidance on the driving route to the destination input by the driver of the vehicle based on the set driving mode comprises:

receiving the destination from the driver of the vehicle;

searching for the driving route to the input destination based on previously stored driver driving information if the vehicle is set to driver driving mode, and offering guidance on the retrieved driving route to the driver of the vehicle;

offering guidance on the autonomous driving information required to reach the input destination if the vehicle is set to autonomous driving mode; and if the vehicle is set to autonomous driving mode, sending the autonomous driving information to the information provision unit, or receiving the behavior information, received from the adjacent vehicle or the terminal of the pedestrian, from the information provision unit and also incorporating the received behavior information into the autonomous driving information.

17. The autonomous driving control method of claim 16, wherein offering guidance on the autonomous driving information required to reach the input destination comprises indicating that current driving mode is autonomous driving mode, displaying driving route information and driving environment information, and displaying current driving information and subsequent driving information.

18. The autonomous driving control method of claim 12, wherein if the driving mode of the vehicle is set to the autonomous driving mode, providing the navigator of the adjacent vehicle and the navigator of the terminal of the pedestrian with the autonomous driving information received from the vehicle, and providing the navigation unit with the behavior information received from the adjacent vehicle and the terminal of the pedestrian comprises:
- registering and managing user information of the navigation unit, the navigator of the adjacent vehicle and the navigator of the terminal of the pedestrian;
- managing location information of the navigation unit, the navigator of the adjacent vehicle and the navigator of the terminal of the pedestrian;
- providing the navigation unit, the navigator of the adjacent vehicle, and the navigator of the terminal of the pedestrian with the driving route into which traffic information has been incorporated; and
- relaying the autonomous driving information and the behavior information by establishing communication among the navigation unit, the navigator of the adjacent vehicle and the navigator of the terminal of the pedestrian.

19. The autonomous driving control method of claim 18, wherein relaying the autonomous driving information and the behavior information by establishing the communication among the navigation unit, the navigator of the adjacent vehicle, and the navigator of the terminal of the pedestrian comprises:
- collecting the autonomous driving information transmitted by the navigation unit;
- collecting the behavior information transmitted by the navigator of the adjacent vehicle or the navigator of the terminal of the pedestrian;
- receiving a request for the behavior information of the adjacent vehicle or the pedestrian from the navigation unit, and sending the behavior information of the adjacent vehicle or the pedestrian to the navigation unit; and
- receiving a request for the autonomous driving information of the vehicle from the navigator of the adjacent vehicle or the navigator of the terminal of the pedestrian, and sending the autonomous driving information of the vehicle to the navigator of the adjacent vehicle or the navigator of the terminal of the pedestrian.

20. The autonomous driving control apparatus of claim 1, wherein the new information further includes a current driving information display region indicating a current driving behavior, a subsequent driving information display region indicating a predicted driving behavior, and the information at the lane level includes an indication of a lane in which the vehicle is driving.

* * * * *